Jan. 12, 1937.  W. E. SYKES  2,067,549
MACHINE FOR HARDENING GEAR TEETH
Filed Dec. 10, 1935    3 Sheets-Sheet 1
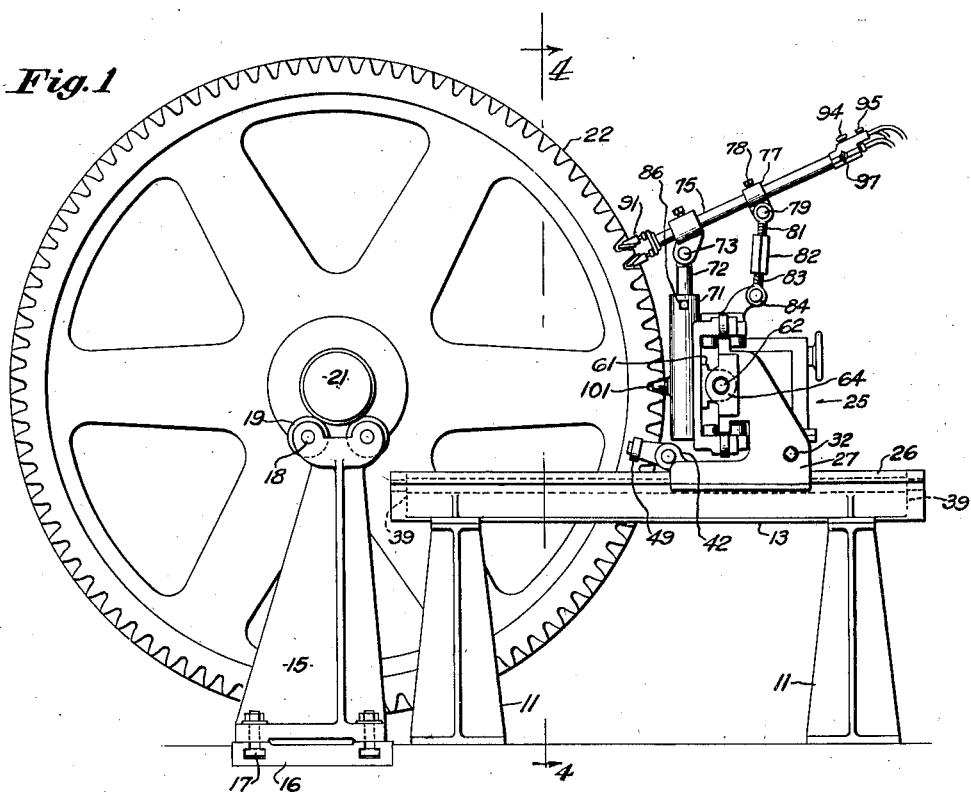
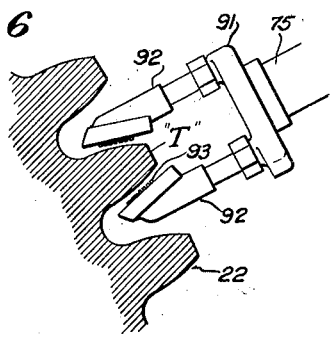
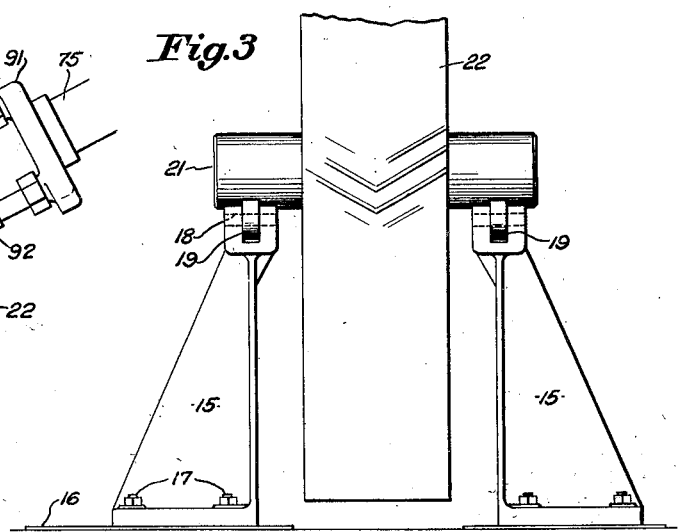
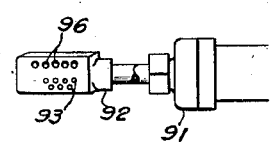
Inventor
William E. Sykes
By
Albert R. Henry
Attorney Jan. 12, 1937. W. E. SYKES 2,067,549
MACHINE FOR HARDENING GEAR TEETH
Filed Dec. 10, 1935 3 Sheets-Sheet 2

Inventor
William E. Sykes
By Albert R. Henry
Attorney

Jan. 12, 1937.   W. E. SYKES   2,067,549
MACHINE FOR HARDENING GEAR TEETH
Filed Dec. 10, 1935   3 Sheets-Sheet 3
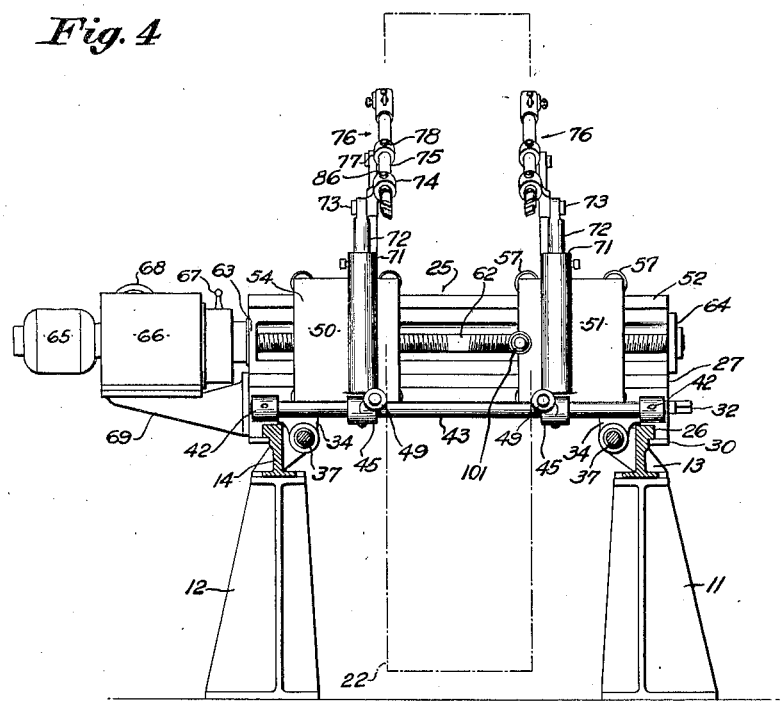
Inventor
William E. Sykes
Albert R Henry
Attorney Patented Jan. 12, 1937

2,067,549

UNITED STATES PATENT OFFICE 2,067,549

MACHINE FOR HARDENING GEAR TEETH

William E. Sykes, Buffalo, N. Y.

Application December 10, 1935, Serial No. 53,789

11 Claims. (Cl. 266—4)

This invention relates to a machine for hardening gear teeth by the local application of heat, and it has particular reference to the provision of a machine suitable for the treatment of helical gears of varying sizes.

It has heretofore been proposed to enhance the wear resisting properties of gear teeth by applying intense heat thereto, as, for example, by means of a blow torch, followed by an air or water quenching, thereby converting the steel of which the teeth are made into the martensitic, or hard, form. It has also been proposed to effect such heat treatment by means of machines in which, generally speaking, a blow torch is caused to traverse the faces of the teeth of stationary gears. While such machines have had some application in the treatment of spur gears, in which the tooth contour lies in a substantially plane surface, they are not applicable to the treatment of helical gears, each size of which may present a specifically different and continuously changing tooth contour.

The present invention therefore contemplates the provision of a simple, but wholly effective, means for the localized heat treatment of gears of various dimensions and particularly those of the helical type. To attain this general object, the invention proceeds on the principle of causing a torch or heat treating element to move in a predetermined path adjacent the axis of a rotatably mounted gear, and simultaneously to effect the rotation of the gear to an extent which is so proportioned to the curvature of the teeth, and to the movement of the torch, as to bring successive untreated portions of the gear tooth progressively into the path of the flame.

The various novel features and principles of the invention, and the advantages to be derived from the practice thereof, will be made more apparent by a perusal of the following detailed description of a specific embodiment, illustrated in the accompanying drawings, wherein:

Fig. 1 is a side elevation of the machine with a herringbone gear operatively positioned thereon;

Fig. 3 is a front view of the gear supporting means;

Fig. 4 is a section on the line 4—4 of Fig. 1 with the gear omitted;

Fig. 6 is an enlarged fragmentary section on the line 6—6 of Fig. 2;

Fig. 7 is a top view of the torch element; and,

Fig. 8 is a side view of a support for ring gears.

Figure 2:
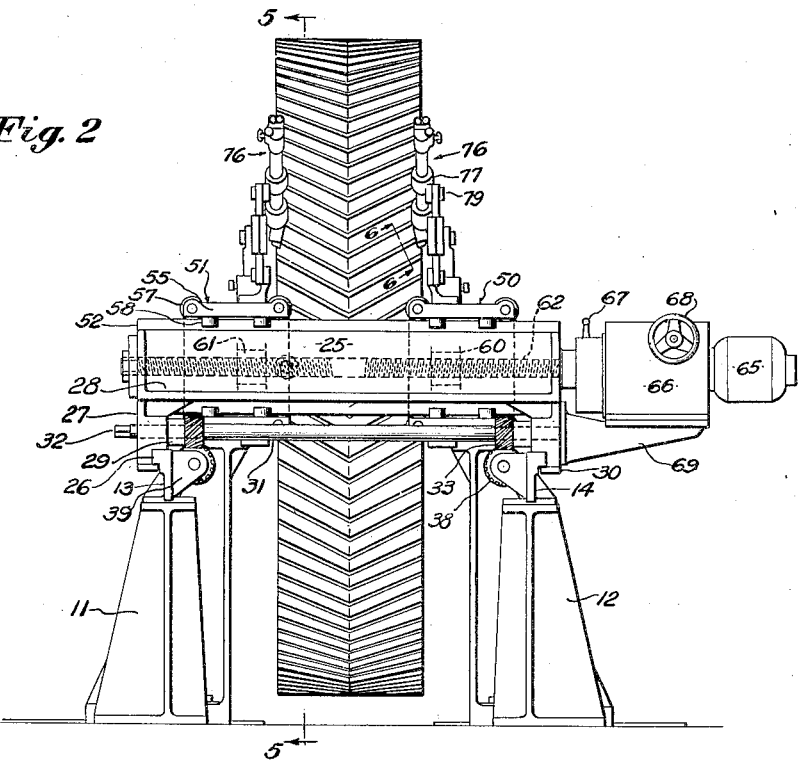
Fig. 2 is a front view thereof.

As best shown in Figs. 1, 2, and 4, the machine includes a torch supporting frame, comprising spaced pairs of pedestals 11 and 12, on which are mounted in parallel relation supporting rails 13 and 14. Gear supporting pedestals 15 are disposed adjacent the ends of the rails, either or both of which may be adjusted with respect to the torch supporting frame. As shown in Figs. 1 and 3, the pedestals 15 are mounted for transverse positioning on floor pads 16 formed with T slots engaging the heads of T bolts 17 which pass through the bases of the pedestals.

The upper ends of the pedestals 15 are formed with bosses in which are rotatably mounted, by means of pintles 18, pairs of supporting rollers 19, adapted to receive the ends of the spindle 21 of a gear 22, which is undergoing treatment. It will thus be seen that, while the gear is mounted with its axis in a substantially horizontal plane, which is fixed relative to the torch supporting frame, the gear nevertheless may rotate on its own axis to bring the successive portions of the gear teeth into the line of travel of the torch. With this type of mounting, a wide variety of gears of various widths and diameters may be mounted adjacent the torch, without need of more than occasional adjustment of the pedestals 15.

It is contemplated that the heating elements or torches shall be movable in a path across the face of the gear, and also shall be bodily adjustable with respect to the gear axis. To this end, there is provided a carriage, generally designated by the reference numeral 25, which is mounted between the supporting rails 13 and 14. The rails are formed with outwardly extending flanges 26 which serve as guides for slides 30 formed on the upright end walls 27 of the carriage 25, which walls are connected by an integral web 28 (see Fig. 2). A bearing 29 is formed on the inner face of each end wall 27, and, as best shown in Figs. 2 and 5, it is located below the web 28 and the upper face of the rail 13 or 14.

Longitudinal adjustment of the carriage is attained by a mechanism including a shaft 31 rotatably mounted in the bearings 29, and having one end projecting beyond the carriage and formed with a square portion 32, which may receive a suitable crank for manual operation of the shaft. Helical gears 33 are secured to the shaft 31 adjacent the slides 30, and they each mesh with a complementary gear 38. The gears 38, as shown in Fig. 5, are formed with hubs 34 which are rotatably received in longitudinally disposed bearings 35 formed in each end wall 27 of the carriage. The hubs extend through the bearings 35 and receive collars 36 which position the gears against axial movement relative to the carriage. The gears 38 are internally threaded to receive screws 37 which extend along the rails 13 and 14 and which are secured at opposite extremities in bosses 39 located at the ends of the rails 13 and 14.

When the shaft 31 is rotated, by the application of a crank, the gears 33, which are keyed thereto, enforce the rotation of the gears 38 within the bearings 35. Since the gears 38 are threaded to the fixed screws 37, however, the gears must move longitudinally of the rails 13 and 14. In so moving, they carry the carriage 25 with them, thus permitting the accurate adjustment of the carriage with respect to the face of the gear which is to be treated. In view of the character of the mechanism, the carriage will maintain its adjusted position without the inclusion of supplementary locking devices for the shaft 31.

Figure 5:
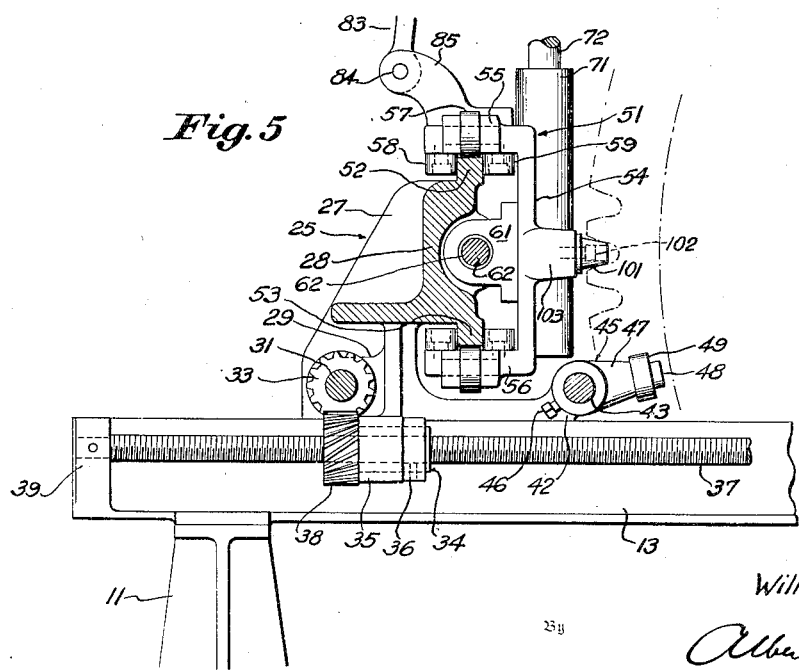
Fig. 5 is an enlarged fragmentary section on the line 5—5 of Fig. 2.

The ends of the side walls 27 adjacent the gear supporting frame are formed with bosses 42 in which are received and secured the opposite ends of a fixed shaft 43 (see Figs. 4 and 5). Mounted on the shaft 43 are a pair of collars 45, each of which may be moved longitudinally of the shaft and then secured by means of set screws 46. Each collar 45 is formed with a projecting hub 47 on which is mounted a roller 49 by means of a stud 48. As illustrated in the drawings, after the carriage 25 has been moved into position with respect to the gear, the rollers 49 are adjusted to contact the sides of the gear, and the collars 45 are then locked in position. This adjustable mechanism overcomes any tendency for the work to move laterally with respect to the supporting frame.

The carriage 25 is formed to receive a pair of saddles, generally designated by the numerals 50 and 51, which are movable on the carriage to traverse the gear face. As these saddles are generally of similar construction, only one will be described in detail. Referring primarily to Fig. 5, it will be observed that the web 28 of the carriage 25 is formed on both its top and bottom edges with square rail sections 52 and 53 to provide tracks for the saddle 51. The saddle itself consists of a body 54 formed with rearwardly extending flanges 55 and 56, each of which is so formed as to receive horizontally mounted rollers 57 and vertically mounted rollers 58 and 59, which respectively contact the top or bottom and side faces of the rails 52 and 53. The saddle is thus mounted for movement longitudinally of the axis of a gear 22 undergoing treatment, and the path of motion of the saddle is the same in all cases, irrespective of the specific gear mounted on the pedestals 15. It will also be noticed that the path of motion is substantially parallel to the axis of the gear 22, thus simplifying the problems of alignment which arise in conjunction with the surface hardening of gears of various sizes.

While the saddles 50 and 51 may be moved manually throughout their respective paths, it is contemplated that they are to be driven from a suitable source of power, to assure uniformity of operation. Nuts 60 and 61 are secured to the inner faces of the saddles 50 and 51, and they are threaded to receive a rotatable screw 62. As shown in Fig. 4, the screw 62, which extends longitudinally of the carriage 25, is formed with right and left hand threads, and accordingly the nuts 60 and 61 are specifically different in respect of the direction of thread formed therein. With this feature in mind, it will now be understood that the present embodiment of the invention contemplates the movement of the two saddles 50 and 51 in opposing directions, either toward or away from the central plane of the gear, so that, when a herringbone gear is undergoing treatment, the converging sections of its teeth may be hardened simultaneously.

The screw 62 is mounted in the carriage 25 by means of bearings 63 and 64 disposed at the ends thereof. A power drive for the screw is mounted on one end of the carriage, and, as shown in Figs. 2 and 4, this drive comprises a motor 65 coupled to a power transmission 66, which in turn is connected to the screw 62. It may be noted that the transmission 66 is to be regarded as any suitable adjustable speed transmission, which includes a reversing gear control 67 and a speed control 68, all of which may be mounted on the bracket 69 secured to the carriage 25. As transmissions of this nature are well known in the art, and as the details thereof form no part of the present invention, it is deemed consistent with a full disclosure simply to make this reference thereto.

The saddles 50 and 51 are each formed with a vertical bearing post 71, disposed on the front face of the plate 54, which slidably receives a rod 72. Secured to the upper end of each rod by a pin connection 73 is an angularly disposed collar 74 adapted to encircle the stem 75 of a heating element, generally designated by the numeral 76. The stem 75 also receives a second collar 77, provided with a set screw 78, which collar is formed to receive a laterally projecting pin 79. The pin 79 is disposed in the eye of one section of a turnbuckle unit 82, the other section 83 of which is also formed with an eye engaging a pin 84 projecting from a boss 85 which is integral with the saddle 51. Set screws 86, passing through the walls of the bearings 71, are also provided to secure the posts 72 in any desired position.

With this arrangement of parts, the torch 76 may, upon being brought up to the face of the gear 22, be given such inclinatory adjustment as is required by the diameter of the gear and the angle of the thread, in order that the flame thereof shall uniformly contact the face of the tooth which is to be hardened. Such adjustment is, obviously, effected by manipulation of the turnbuckle 82, and such rotation of the torch in its supporting collars 74 and 77, as the particular situation indicates.

The heating element or torch 76, previously referred to, may be of any suitable commercial type, but it is advantageously constructed as further illustrated in Figs. 6 and 7. It will here be observed that the head 91 is formed with spaced and opposed tines 92 which are adjusted to straddle a tooth "T" of a gear 22, in slightly spaced relation to the face of the tooth. Closely spaced rows of gas nozzles 93 are formed in the inner face of each tine 92, and these are supplied with the usual mixture of gases from suitable sources of supply (not shown) by piping contained within the hollow stem 75 and terminating in the mixing and control valves 94 and 95 located at the outermost end of the stem. A row of spray nozzles 96 is also formed on the face of each tine 92, which is supplied with water, or other quenching medium, delivered under pressure through piping extending through the stem 75, and terminating in the valve 97.

It will be noted that the disposal of the water spray with respect to the flame nozzles is such as to quench the tooth immediately after the heating thereof, when the torches are moved from the sides of the gear toward the median plane thereof. It will thus be understood that, in the case of a herringbone gear, it is proposed to align a torch at the outer edges of a given tooth, and operate the drive mechanism 66 in such fashion as to work toward the center. As the right and left hand torches approach the median plane, the flames may be extinguished, the drive reversed, and the operation repeated for the next tooth. When heat treating other types of gears, however, such obvious modifications of procedure may be resorted to as are indicated by the specific tooth contour.

As thus far described, the machine provides for the mounting of a gear to be treated, and the traverse movement of a heating element in a fixed path of travel which is independent of the gear configuration or size. In this specific embodiment of the invention, the path of the heating element is in a horizontal line, parallel to the gear axis. In the case of all helical gears, the tooth contour does not, however, conform to such line of travel. It is therefore apparent that the torch and tooth can properly contact at only one point or zone, unless means are provided to move the gear in such fashion as to effect a continuous rectification between the torch movement and the curvature of the tooth. That is to say, in order to maintain proper relation between the torch and the tooth, which is constantly changing its direction, it is necessary to provide a timed movement of the gear with respect to the direction and speed of the torch.

In the present embodiment of the invention, the desired synchronism is obtained by taking advantage of the fact that the teeth of helical gears are equally spaced in all planes of reference perpendicular to the gear axis. Accordingly, the present invention proposes, in the specific embodiment herein described, to provide an indexing finger moving in unison with the saddles 50 and 51, and engaging another tooth of the gear undergoing treatment. By virtue of the lateral thrust of such finger against the face of its contacting gear tooth, the gear is caused to rotate as the saddles move, thus bringing into the line of travel of the heating element the successive untreated portions of the tooth undergoing treatment.

As shown in Fig. 5, the indexing or drive finger consists of a tapered roller 101, rotatably mounted on a stud 102 secured to a boss 103 integral with the plate 54 of the saddle 51. The finger 101 is mounted below the torch nozzles 93 to engage another gear tooth, as shown in Fig. 1, and the mounting is such that the finger 101 precedes the torch by a slight distance, as the torch element moves inwardly. When the motor drive is connected to the screw 62, to drive the saddles 50 and 51 simultaneously toward the gear center, the finger 101, by virtue of its engagement with the face of an adjacent tooth, causes the gear 22 to rotate counter-clockwise (Fig. 1) on its own axis, thereby bringing into the line of travel of the heating elements the successive untreated portions of the tooth "T", so that the hardening action is accomplished in a progressive and uniform manner.

The mode of operation of the machine, and its applicability to a wide variety of gears of various types and diameters, will be apparent from the foregoing description. In summary, it may be pointed out that the gear to be treated, whatever its size, is mounted on the pedestals 15, which are adjusted toward or away from each other a suitable distance to receive the ends of the spindle 21. With the gear thus positioned between the rails 13 and 14 of the carriage supporting frame, the shaft 31 is then rotated to bring the torch saddles 50 and 51 up to the gear face.

This adjustment will bring the indexing finger 101 into engagement with the outer edge of a gear tooth, and it is to be supposed that the saddles 50 and 51 are already spaced sufficiently to permit the adjustment of the nozzles 93 adjacent the outer ends of a tooth "T", as described in connection with Fig. 6. With this adjustment properly secured, the burners are ignited, the water spray turned on, and the screw 62 is then rotated through its driving mechanism. As long as the screw 62 is not driven, the gear 22 is effectively locked in position by the engagement of the finger 101, which moves only with the saddles. When, however, the saddles are moved in their predetermined paths across the gear face, the finger 101 causes the gear to rotate, to just that extent which will insure the progressive alignment of the torches with the successive portions of the tooth "T". Such rotation, of course, will be counter-clockwise or clockwise, depending on whether the gear is mounted as shown in Fig. 1, or with the teeth pointing in the opposite direction.

When the heating elements approach the center of the gear, the power drive is reversed, and at this time the flames may be extinguished, while the water spray continues to play on the tooth which has just been hardened, to complete the cooling thereof. When the finger 101 is disengaged, the gear is then rotated to permit new engagement with the next tooth, and the foregoing heat treating operations are repeated.

Another type of gear mounting is shown in Fig. 8, and it is particularly adapted for use with helical ring gears of large diameter. In gears of this type, it would be necessary to provide a spider for the gear if the described spindle type of mounting were used. To avoid such complications, a peripheral support is provided and it comprises pairs of spaced pedestals 111, mounted on floor pads 112, which are located substantially in line with the rails 13 and 14. The pedestals, through T-bolt connections 113 with the rails, are longitudinally adjustable. Each pedestal is formed with vertical rails 114 which slidably receive a bearing block 115 therebetween. A screw 116 extends vertically through the pedestal for engagement with the block 115, and the vertical positioning of the block is adjusted by means of a nut 117 bearing against the base of the pedestal.

A supporting roller 118 is mounted between each pair of pedestals and it is formed with terminal trunnion portions 119 which are rotatably received in the bearing blocks 115. When the bearing blocks and accompanying rollers are adjusted to the correct spacing and height, the ring gear R may be then placed on the rollers, and the carriage 25 brought into operative position therewith for the conduct of the hardening operation, as above described.

From what has been said above, it will be apparent that while the machine is particularly adapted to the hardening of herringbone gears, it may be also utilized for gears of other types, including spur gears, and gears with staggered teeth. In treating the last mentioned type, it will, of course, be obvious that the torches 76 will be offset from each other. Many other modifications may also be made by those skilled in the art without departing from the principles of the invention, and it is therefore intended that the scope of the invention should be determined from the context of the following claims.

I claim:

1. A gear hardening machine comprising, in combination with means for rotatably mounting a gear, a heating element, means for moving the heating element in a predetermined path in close proximity to the face of the gear and a tooth thereof, and means cooperating with said moving means adapted to rotate said gear through contact with a tooth thereof an amount proportional to both the movement of the heating element and the inclination of the gear tooth to the axis of the gear.

2. A machine for hardening gear teeth by local application of heat comprising a heating element, means for moving said heating element in a predetermined lineal path, means for mounting a gear with a section of a tooth thereof in the path of said heating element, and means cooperating with said moving means and adapted to cooperate with another tooth of said gear to move said gear in synchronized relation to the movement of said element and the inclination of the tooth, whereby successive portions of the tooth are progressively subjected to the influence of said element.

3. In a machine for hardening gear teeth by local application of heat, a heating element, means for moving said element in a predetermined path, means for rotatably mounting a gear to be treated in proximity to said heating element, and means cooperating with said moving means adapted to engage a gear tooth and to present successive untreated portions of a gear tooth to said heating element as said element moves in said predetermined path.

4. A machine for hardening gear teeth by local application of heat comprising means for rotatably mounting the gear to be hardened, a carriage mounted adjacent the face of the gear, means associated with said carriage adapted to engage the sides of the gear to position said carriage and gear in relatively fixed axial relation, a saddle mounted on said carriage for movement across the face of the gear, a heating element mounted on said saddle, means for locating said heating element in close proximity to a gear tooth when said carriage and said saddle are in a predetermined position adjacent the gear, and a finger extending from said saddle adapted to engage said gear between the teeth thereof, whereby, upon movement of the saddle over the carriage, the gear and carriage will be relatively rotated to maintain the proximity of the heating element to said tooth throughout the successive portions thereof.

5. A machine for hardening gear teeth comprising means for freely rotatably mounting the gear to be hardened, a fixed frame including parallel rails disposed transversely relative to the axis of the gear, a carriage slidably mounted on the rails, a manually operable mechanism comprising cooperating elements on the carriage and rails for positioning said carriage adjacent the face of the gear, a saddle slidably mounted on the carriage for movement parallel to the axis of the gear, a torch positioned on the saddle and adapted to apply heat to a tooth of the gear, an indexing and driving finger on the saddle adapted to engage teeth of the gear remote from said torch, and drive means for the saddle for moving it and said finger on said carriage to traverse the face of the gear and to effect rotation of the gear through the engagement of said finger with said teeth.

6. A machine for hardening gear teeth comprising a pair of aligned bearing pedestals adapted to support the spindle of the gear to be hardened, said pedestals being mounted for adjustment toward each other, a fixed frame including parallel rails disposed transversely relative to the bearing pedestals, a carriage adjustably mounted on the rails, a saddle slidably mounted on the carriage for movement parallel to the axis of the gear, a torch positioned on the saddle and adapted to apply heat to a tooth of the gear, an indexing and driving finger on the saddle adapted to engage between teeth of the gear remote from said torch, and drive means for the saddle for moving it and said finger on said carriage to traverse the face of the gear and to effect rotation of the gear through said engagement of said finger.

7. A machine for hardening gear teeth comprising means for freely rotatably mounting the gear to be hardened, a saddle, means for mounting the saddle for transverse parallel movement relative to the face of the gear, drive means for the saddle, a torch positioned on the saddle and having gas nozzles and water nozzles for applying progressively heat and a quenching spray to a tooth of the gear, and a drive finger on the saddle adapted to engage between teeth of the gear remote from said torch and to rotate said gear through said engagement as said saddle moves.

8. A machine for hardening the teeth of a herringbone gear comprising means for rotatably mounting the gear to be hardened, a carriage formed with guide rails disposed in parallelism with respect to the axis of the gear, adjustable collars mounted on the carriage and adapted to engage opposite side faces of the gear to retain it against axial movement, a pair of saddles slidably mounted on the guide rails, a torch on each saddle positioned to apply heat to a common tooth of the gear, said torches being equally spaced with respect to the median plane of the gear, a drive finger on one saddle engaging teeth of the gear remote from said torches, and drive means for the saddles for moving them in opposing directions on said carriage.

9. A machine for hardening the teeth of a herringbone gear comprising means for rotatably mounting the gear to be hardened, a carriage formed with guide rails disposed in parallelism to the axis of the gear, a pair of saddles slidably mounted on the guide rails, a torch on each saddle positioned to apply heat to a common tooth of the gear, said torches being equally spaced with respect to the median plane of the gear, a drive finger on one saddle adapted to engage a tooth of the gear remote from said torches, and drive means for the saddles for moving them in opposing directions on said carriage.

10. A machine for hardening gear teeth of the helical type, comprising means for rotatably mounting the gear to be hardened, a saddle, means for mounting the saddle for transverse parallel movement relative to the face of the gear, drive means for the saddle, a vertical bearing in the saddle, a rod adjustably secured therein, a torch adapted to apply heat to a tooth of the gear, a pivotal connection between the rod and said torch, a second connection comprising an adjustable member connecting said torch to the saddle, said connections permitting the torch to be radially aligned with the gear, and a drive finger on the saddle engaging teeth of the gear remote from said torch and adapted through said engagement to rotate said gear as said saddle moves.

11. A machine for hardening gear teeth comprising means for freely rotatably mounting the gear to be hardened, a saddle, means for mounting the saddle for transverse parallel movement relative to the face of the gear, a torch adapted to apply heat to a tooth of the gear, means for mounting the torch on the saddle including adjusting means for radially aligning the torch with the gear, and a drive finger on the saddle slidably engaging teeth of the gear remote from said torch to effect rotation of said gear through said engagement as said saddle moves.

WILLIAM E. SYKES.